United States Patent [19]
Bates et al.

[11] Patent Number: 6,069,190
[45] Date of Patent: *May 30, 2000

[54] INK COMPOSITIONS HAVING IMPROVED LATENCY

[75] Inventors: Jodi A. Bates, Billerica, Mass.; Joseph E. Johnson, Nashua, N.H.

[73] Assignee: Cabot Corporation, Boston, Mass.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/665,127

[22] Filed: Jun. 14, 1996

[51] Int. Cl.$^7$ ...................................................... C09D 5/00
[52] U.S. Cl. ............................................................. 523/161
[58] Field of Search ............................................. 523/161

[56] References Cited

U.S. PATENT DOCUMENTS

| | | | |
|---|---|---|---|
| T860,001 | 3/1969 | Gessler | 260/41.5 |
| 2,121,535 | 6/1938 | Amon | 106/473 |
| 2,439,442 | 4/1948 | Amon et al. | 23/209.1 |
| 2,793,100 | 5/1957 | Weihe | 423/460 |
| 2,867,540 | 1/1959 | Harris | 106/476 |
| 3,011,902 | 12/1961 | Jordon | 106/30 R |
| 3,025,259 | 3/1962 | Watson et al. | 106/476 |
| 3,335,020 | 8/1967 | Aboytes et al. | 106/476 |
| 3,423,391 | 1/1969 | Kindler et al. | 260/141 |
| 3,528,840 | 9/1970 | Aboytes | 106/473 |
| 3,671,476 | 6/1972 | Terai et al. | 260/23 |
| 3,686,111 | 8/1972 | Makhlouf et al. | 524/530 |
| 4,006,031 | 2/1977 | Ferch et al. | 106/473 |
| 4,014,844 | 3/1977 | Vidal et al. | 106/472 |
| 4,097,437 | 6/1978 | Dhake | 524/236 |
| 4,156,616 | 5/1979 | Dietz | 106/308 N |
| 4,265,768 | 5/1981 | Beasley et al. | 210/682 |
| 4,320,011 | 3/1982 | Sato et al. | 210/694 |
| 4,366,139 | 12/1982 | Kühner et al. | 423/449 |

(List continued on next page.)

FOREIGN PATENT DOCUMENTS

| | | |
|---|---|---|
| 0 006 190 A1 | 1/1980 | European Pat. Off. . |
| 0 475 075 A1 | 6/1991 | European Pat. Off. . |
| 0 050 354 | 4/1992 | European Pat. Off. . |
| 72775 | 4/1960 | France . |
| 1331889 | 5/1963 | France . |
| 1948443 | 4/1971 | Germany . |
| 23 55 758 | 5/1975 | Germany . |
| 56078629 | 6/1981 | Japan . |
| 59/82467 | 5/1984 | Japan . |
| 62/250073 | 10/1987 | Japan . |
| 6067421 | 3/1994 | Japan . |
| 862018 | 3/1961 | United Kingdom . |
| 1191872 | 5/1970 | United Kingdom . |
| 2 188 311 | 9/1987 | United Kingdom . |
| WO 91/02034 | 8/1990 | WIPO . |
| WO 91/15425 | 10/1991 | WIPO . |
| WO 92/13983 | 8/1992 | WIPO . |
| WO 95/01838 | 1/1995 | WIPO . |
| WO 96/18688 | 6/1996 | WIPO . |
| WO 96/18694 | 6/1996 | WIPO . |
| WO 96/18695 | 6/1996 | WIPO . |
| WO 96/18696 | 6/1996 | WIPO . |
| WO 96/37547 | 11/1996 | WIPO . |

OTHER PUBLICATIONS

Derwent Abstract, AN No. 80–03330C, "Sulphonated Carbon Pigment Production by Treating Technical Grade Carbon with Hot Aqueous Acid," SU,A, 659523, Apr. 1979.

Derwent Abstract, AN No. 82–28019E, "Penetrating Flexographic Print Ink Based Polyacrylic Resin," Oct. 17, 1979, SU,A, 834062.

Derwent Abstract, AN No. 86–335147, "Wear Resistant Rubber Composition for Tire Tread Rubber," Apr. 30, 1985, JPA 61–250042, Nov. 1986.

Derwent Abstract, AN N. 93–261471, "Carbon Black for Coating Magnetic Recording Media—Having Silicon Dioxide Coating, Giving Good Dispersibility, Lubrication, etc.", Japanese Patent Application No. 5178604, Jul. 20, 1993.

Derwent Abstract, AN No. 95–183086, "Tire Treated Rubber Composition," Oct. 21, 1993, JPA 07102116.

Derwent Abstract, AN No. 94–189154, "Ink for Writing Implements," May 10, 1994, JPA 61–28517A.

Patent Abstracts of Japan Publication No. JP7102116, "Rubber Composition for Tire Tread," Apr. 18, 1995.

Moschopedis, et al., "The Reaction of Diazonium Salts with Humic Acids and Coals: Evidence for Activated Methylene Bridges in Coals and Humic Acids," *Fuel,* vol. 43, No. 4, pp. 289–98, 1964, no month.

Roberts et al., *Basic Principles of Organic Chemistry,* Second edition, W.A. Benjamin, Inc., Pub., p. 1080, no date available.

Zoheidi et al., "Role of Oxygen Surface Groups in Catalysis of Hydrogasification of Carbon Black by Potassium Carbonate," *Carbon,* vol. 25, No. 6, pp. 809–819, 1987, no month available.

International Search Report for PCT/US 97/08049 mailed Sep. 15, 1997.

Delamar et al., J. Am. Chem. Soc. 1992, 114, 5883–5884, no month available.

*Primary Examiner*—Paul R. Michl

[57] ABSTRACT

An ink composition is disclosed including a liquid vehicle and an ionically charged organic pigment and a hydroxylated hydrocarbon humectant having at least two hydroxyl groups. The ionically charged pigment may be black, blue, brown, cyan, green, violet, magenta, red, orange, yellow, mixtures thereof, and the like. The ionically charged pigment, due to the nature of its surface charge, is readily-dispersed in the liquid vehicle of the ink composition without the addition of a surfactant or other dispersing aid or additive. In a preferred embodiment, the ionically charged pigment has sufficient ionizable groups to maintain the colloidal stability of the pigment in the ink composition.

Further disclosed is a method for generating printed images which include incorporating into a printing apparatus the ink compositions described above and generating an image onto a substrate.

21 Claims, No Drawings

U.S. PATENT DOCUMENTS

| | | | |
|---|---|---|---|
| 4,443,263 | 4/1984 | Dietz | 106/287.24 |
| 4,452,638 | 6/1984 | Gallus | 106/97 |
| 4,530,961 | 7/1985 | Nguyen et al. | 106/20 R |
| 4,537,633 | 8/1985 | Hong | 106/96 |
| 4,597,794 | 7/1986 | Ohta et al. | 106/20 C |
| 4,820,751 | 4/1989 | Takeshita et al. | 523/215 |
| 4,831,011 | 5/1989 | Oikawa et al. | 502/406 |
| 4,840,674 | 6/1989 | Schwarz, Jr. | 106/22 |
| 5,098,475 | 3/1992 | Winnik et al. | 106/22 |
| 5,100,469 | 3/1992 | Pontes et al. | 106/20 |
| 5,114,477 | 5/1992 | Mort et al. | 106/20 |
| 5,129,948 | 7/1992 | Breton et al. | 106/22 |
| 5,130,363 | 7/1992 | Scholl et al. | 524/392 |
| 5,134,187 | 7/1992 | Aihara | 524/548 |
| 5,156,675 | 10/1992 | Breton et al. | 106/22 |
| 5,159,009 | 10/1992 | Wolff et al. | 106/475 |
| 5,184,148 | 2/1993 | Suga et al. | 106/20 R |
| 5,190,582 | 3/1993 | Shinozuka et al. | 106/20 D |
| 5,207,825 | 5/1993 | Schwartz, jr. | 106/22 |
| 5,223,026 | 6/1993 | Schwarz, Jr. | 106/20 |
| 5,242,489 | 9/1993 | Schwarz, Jr. | 106/20 |
| 5,254,158 | 10/1993 | Breton et al. | 106/20 |
| 5,256,193 | 10/1993 | Winnik et al. | 106/21 |
| 5,258,064 | 11/1993 | Colt | 106/20 |
| 5,266,106 | 11/1993 | Winnik et al. | 106/22 |
| 5,271,764 | 12/1993 | Winnik et al. | 106/21 |
| 5,281,261 | 1/1994 | Lin | 106/20 R |
| 5,282,887 | 2/1994 | Gay et al. | 106/261 |
| 5,286,286 | 2/1994 | Winnik et al. | 106/21 |
| 5,340,388 | 8/1994 | Breton et al. | 106/22 |
| 5,360,475 | 11/1994 | Nukada | 106/410 |
| 5,364,462 | 11/1994 | Crystal et al. | 106/22 |
| 5,384,013 | 1/1995 | Husband | 162/168.1 |
| 5,387,483 | 2/1995 | Takagi | 430/204 |
| 5,389,131 | 2/1995 | Colt et al. | 106/20 |
| 5,389,133 | 2/1995 | Gundlach et al. | 106/22 |
| 5,401,313 | 3/1995 | Supplee | 106/712 |
| 5,413,630 | 5/1995 | Schwarz et al. | 106/22 |
| 5,418,108 | 5/1995 | Kmiecik | 523/335 |
| 5,449,402 | 9/1995 | Whalen Shaw | 106/416 |
| 5,454,864 | 10/1995 | Whalen Shaw | 523/400 |
| 5,554,739 | 9/1996 | Belmont | 534/885 |
| 5,559,169 | 9/1996 | Belmont et al. | 523/215 |
| 5,571,311 | 11/1996 | Belmont et al. | 106/20 R |
| 5,575,845 | 11/1996 | Belmont et al. | 106/712 |
| 5,630,868 | 5/1997 | Belmont et al. | 106/31.75 |
| 5,654,357 | 8/1997 | Menashi et al. | 524/495 |
| 5,672,198 | 9/1997 | Belmont | 106/20 |
| 5,698,016 | 12/1997 | Adams et al. | 106/31.6 |
| 5,707,432 | 1/1998 | Adams et al. | 106/31.6 |
| 5,713,988 | 2/1998 | Belmont et al. | 106/31.6 |
| 5,837,045 | 11/1998 | Johnson | 106/31.85 |

INK COMPOSITIONS HAVING IMPROVED LATENCY

BACKGROUND OF THE INVENTION

1. Field of the Invention

The present invention is directed to ink compositions and, more particularly, to aqueous ink compositions suitable for imaging applications, such as ink jet printing processes.

2. Discussion of the Related Art

Ink jet printing is a non-impact process wherein droplets of ink are produced and deposited on a substrate such as paper, transparent film, or textile material in response to an electronic signal. Ink jet printing systems are typically classified by two known types: continuous stream or drop-on-demand.

Ink compositions which are useful in imaging applications, such as ink jet ink printing systems, are well known and generally contain water soluble dyes. Also known is the addition of suitable cosolvents systems such as glycols and other humectants to such dye based ink compositions in order to improve the latency and recoverability in printers utilizing such compositions. See, for example, U.S. Pat. No. 5,389,133 to Gundlach et al., U.S. Pat. No. 5,286,289 to Winnik et al., U.S. Pat. No. 5,271,764 to Winnik et al., U.S. Pat. No. 4,840,674 to Schwartz, the specifications of which are incorporated herein in its entirety by reference.

Although dye-based inks are suitable for their intended purposes, dyes have several disadvantages when used in ink jet inks. For example, dyes, being water-soluble in a water/organic mixture, may dissolve and run when exposed to moisture or water. Dye images may further smear or rub off on contact with felt pen markers or upon being rubbed or touched by finger. Dyes also exhibit poor light stability when expose to visible or ultraviolet light.

Pigments are also known as colorants in ink compositions but have not received a wide degree of acceptance in ink jet ink systems, for example, because of problems associated with the performance and reliability of the composition, i.e., print properties, stability, latency, and the like.

As a result, although known compositions are suitable for their intended purpose, a need remains for improved ink compositions, especially for use in the ink jet printers, which overcome the problems typically associated with current dye-based and pigment system. In addition, there is a need for improved ink compositions which exhibit improved latency and recoverability in their respective printing systems while providing good print properties.

SUMMARY OF THE INVENTION

The present invention is directed to ink compositions comprising an ionically charged pigment and a hydroxylated hydrocarbon humectant having at least two hydroxyl groups. The ionically charged pigment includes, but is not limited to, black, blue, brown, cyan, green, violet, magenta, red, orange, yellow, as well as mixtures thereof. The hydroxylated hydrocarbon humectant is selected from the group consisting of glycols, glycerol, polyols, and derivatives and mixtures thereof.

Also disclosed is a method for generating printed images which include incorporating into a printing apparatus the ink compositions described above and generating an image onto a substrate.

DETAILED DESCRIPTION OF THE INVENTION

The present invention is directed to ink compositions comprising an ionically charged pigment and a hydroxylated hydrocarbon humectant having at least two hydroxyl groups. The ionically charged pigment includes, but is not limited to, black, blue, brown, cyan, green, violet, magenta, red, orange, yellow, mixtures thereof, and the like. By ionically charged is meant that the pigment, due to the nature of its surface groups, is readily-dispersing in the liquid vehicle of the ink composition without the addition of a surfactant or other dispersing aid or additive. Preferably, the ionically charged pigment further has sufficient ionizable groups which will enable the ink compositions to further maintain its colloidal stability without the addition of a surfactant or stabilizing aid. As a result, the ionically charged pigment of the present invention will readily disperse, and remains dispersed, in the liquid vehicle of the ink composition under low shear stirring or mixing conditions.

Examples of suitable black pigments include carbon blacks, such as channel black, furnace black, lamp black and the like. Examples of suitable classes of colored pigments include anthraquionones, monoazos, disazos, phthalocyanine blues, phthalocyanine greens, pyranthrones, perylenes, heterocyclic yellows, quinacridones and indigoids.

In a preferred embodiment, the ionically charged pigment has an attached organic group. A preferred set of organic groups which may be attached are organic groups substituted with an ionic or an ionizable group as a functional group. An ionizable group is one capable of forming an ionic group in the medium of use. The ionic group may be an anionic group or a cationic group and the ionizable group may form an anion or cation.

Ionizable functional groups forming anions include, for example, acidic groups or salts of acidic groups. The organic groups, therefore, include groups derived from organic acids. Preferably, when an organic group contains an ionizable group forming an anion, such an organic group has a) an aromatic group and b) at least one acidic group having a $pK_a$ of less than 11, or at least one salt of an acidic group having a $pK_a$ of less than 11, or a mixture of at least one acidic group having a $pK_a$ of less than 11 and at least one salt of an acidic group having a $pK_a$ of less than 11. The $pK_a$ of the acidic group refers to the $pK_a$ of the organic group as a whole, not just the acidic substituent. More preferably, the $pK_a$ is less than 10 and most preferably less than 9. Preferably, the aromatic group of the organic group is directly attached to the carbon black. The aromatic group may be further substituted or unsubstituted, for example, with alkyl groups. More preferably, the organic group is a phenyl or a naphthyl group and the acidic group is a sulfonic acid group, a sulfinic acid group, a phosphonic acid group, or a carboxylic acid group. Most preferably, the organic group is a substituted or unsubstituted sulfophenyl group or a salt thereof; a substituted or unsubstituted carboxyphenyl; a substituted or unsubstituted (polysulfo)phenyl group or a salt thereof; a substituted or unsubstituted sulfonaphthyl group or a salt thereof; or a substituted or unsubstituted (polysulfo)naphthyl group or a salt thereof. Such groups include, for example, $C_6H_4SO_3^-M_+$, $C_6H_4CO_2^-M^+$, wherein $M^+$ is $Na^+$, $K^+$, or $Li^+$.

Amines represent examples of ionizable functional groups that form cationic groups. For example, amines may be protonated to form ammonium groups in acidic media. Preferably, an organic group having an amine substituent has a $pK_b$ of less than 5. Quaternary ammonium groups and quaternary phosphonium groups also represent examples of cationic groups. Preferably, the organic group contains an aromatic group such as a phenyl or a naphthyl group and a quaternary ammonium or a quaternary phosphonium group. The aromatic group is preferably directly attached to the carbon black. Quaternized cyclic amines, and even quaternized aromatic amines, can also be used as the organic group. Thus, N-substituted pyridinium compounds, such as N-methyl-pyridyl, can be used in this regard.

Examples of organic groups include, but are not limited to, $C_6H_4N(CH_3)_3^+X^-$, $C_6H_4COCH_2N(CH_3)_3^+X^-$, $C_6H_4(NC_5H_5)^+X^-$, $(C_5H_4N)C_2H_5^+X^-$, $C_6H_4COCH_2(NC_5H_5)^+X^-$, $(C_5H_4N)CH_3+X^-$, and $C_6H_4CH_2N(CH_3)_3^+X^-$, wherein $X^-$ is a monovalent ion.

The Ionically charged pigment of the present invention is prepared by the method described in U.S. patent application Ser. No. 08/356,653 to Belmont entitled, "Reaction of Carbon Materials with Diazonium Salts and Resultant Carbon Products," filed Dec. 15, 1994; U.S. patent application Ser. No. 08/356,660, to Belmont entitled, "Reaction of Carbon Black with Diazonium Salts, Resultant Carbon Black Products and Their Uses," filed Dec. 15, 1994; and U.S. patent application Ser. No. 08/527,525 to Belmont entitled, "Reaction of Carbon Black with Diazonium Salts, Resultant Carbon Black Products and Their Uses," filed Dec. 14, 1995, the disclosures of which are fully incorporated herein by reference. Although such methods are primarily directed to carbon materials and carbon black, such described methods are useful to prepare the ionically charged pigment of the present invention, whether it be a black or colored pigment. It is also recognized by those skilled in the art that other methods of preparation which would yield the required ionic stabilization are also suitable.

The ionically charged pigment of the present invention is present in the ink compositions in an amount effective to provide the desired image quality, e.g., optical density, without detrimentally affecting the performance of the ink. Typically, the ionically charged pigment will be present in an amount ranging from about 1% to about 20%, preferably from about 2% to about 10%, based on the weight of the ink composition. In addition, if the ionically charged pigment is a modified pigment having at least one attached organic group, the pigment should be treated with the desired modifying agent in an amount sufficient to provide the desired utility in the end product application while maintaining the colloidal stability of the pigment in the ink composition.

The ionically charged pigment is typically as small as possible to enable a stable colloidal suspension of the pigment in the liquid vehicle and to prevent clogging of the ink channels and nozzles when used in the desired printing application. For example, a preferred average aggregate diameter of the ionically charged pigment for use in a thermal ink jet printer are generally below 1.0 micron, preferably in a range from about 0.005 micron to about 0.3 micron.

The humectant of the present invention is characterized as a hydroxylated hydrocarbon having at least two hydroxyl groups. The humectant should have a sufficient degree of miscibility and solubility in the liquid vehicle of the ink composition to provide improved latency of the ink composition while maintaining the colloidal stability of the system. Examples of suitable humectants include glycols and derivatives thereof, such as ethylene glycol, butylene glycol, propylene glycol, diethylene glycol, dipropylene glycol, pentamethylene glycol, polyethylene glycol, polypropylene glycol, trimethylene glycol; glycerol and derivatives thereof; polyols and derivatives thereof, such as butanetriol, trishydroxymethylethane, mesoerythritol, and xylitol; as well as mixtures thereof.

The humectant of the present invention is present in an amount effective to improve the latency of the ink composition in a printing apparatus without detrimentally effecting the other properties of the ink composition, e.g. viscosity, conductivity, drop size, pH, optical density, surface tension and the like. Generally, depending on the particular humectant used, the amount of the humectant in the ink compositions is equal to or greater than about 15%, by weight, and preferably equal to or greater than 20%, by weight, because such systems were found to possess good latency, stability and physical properties.

Although the use of humectants are known in the prior art, it has been found that many such humectants, e.g. alcohols and ethers, are not suitable with the ionically charged pigment of the present invention due to insufficient latency and colloidal instability. In addition, the humectants of the prior art are effectively used at levels considerably lower than that disclosed herein. It has therefore been recognized that ionically charged pigment systems will behave differently than existing dyes and nonionically charged pigment (i.e. pigment systems requiring the addition of a surfactant or polymer for dispersability). In order to achieve a useful ink system with desired properties, a unique interrelationship has been found to exist between the ionically charged pigment itself, the type of humectant, and the amount of humectant in a particular ink composition.

The ink compositions of the present invention experience improved latency and recoverability when used in printing systems. Latency is the period during which the printer may stop printing while it contains the ink and subsequently be restarted without clogging of the printer nozzle. Stated differently, latency is the period of time during which the printhead can remain idle before deterioration of the inks' jetting performance occurs. As a result, the latency should be as high, i.e. long, as possible to enable restarting of the printer after extended idle periods.

The ink compositions of the present inventions may be prepared utilizing conventional techniques known to those skilled in the art, such as combining or mixing the desired component in a suitable liquid vehicle or medium. Typically, the ink compositions are aqueous systems and, as such, include a significant amount of water, preferably deionized or distilled water, or water and a water miscible or water soluble solvent. For example, the amount of water or similar medium is generally present in an amount ranging from about 55% to about 80%, preferably from about 65% to 75%, based on the weight of the ink composition.

The ink compositions of the present invention may be buffered to the desired pH by the addition of a suitable base, such as sodium hydroxide, ammonium hydroxide, triethylamine, dimethylethanolamine and the like, or a suitable acid, such as mineral acids, hydrochloric acid, sulfuric acid and the like. In addition, a polymer which is soluble in the ink composition may be added to improve the waterfastness of the images generated from the ink compositions. By "soluble" is meant that the polymer will dissolve in the ink vehicle to form a one phase system. These polymers include, for example, polyvinyl alcohol, polyester, polyestermelamine, styrene-acrylic acid copolymers, styrene-maleic acid copolymers, styrene-maleic acid-alkyl acrylate copolymers, styrene-metacrylic acid copolymers, styrene-metacrylic acid-alkyl acrylate copolymers, styrene-maleic half ester copolymers, vinyl napthalene-acrylic acid copolymers, vinyl napthalene-maleic acid copolymers and salts thereof. Additional polymers include polyvinylimidazole, derivatives of polyvinylimidazole, copolymers of vinylimidazole, copolymers of vinylimidazole derivatives, polyvinylpyridine, derivatives of polyvinylpyridine, copolymers of vinylpyridine, copolymers of vinylpyridine derivatives, polyethyleneimine, derivatives of polyethyleneime, and mixtures thereof, as described in U. S. patent application Ser. No. 08/628,202 to Bates et al., entitled "Ink Compositions and Method of Generating Images Produced Therefrom," the disclosure of which is fully incorporated herein by reference.

Suitable additives are also generally incorporated into the ink compositions to impart a number of desired properties while maintaining the stability of the compositions. For example, a surfactant or suitable polymer may be used to enhance the colloidal stability of the ionically charged pigment in the ink composition. Other additives are well known in the art and include biocides, binders, drying accelerators, penetrants and the like. The amount of a particular additive will vary depending on a variety of factors but are generally present in an amount ranging between 0% and 10%, preferably between 0.1% and 5%, although the amount may be outside this range.

Printed images may be generated from the ink compositions of the present invention by incorporating such compositions into a suitable printing apparatus, and generating an image onto a substrate. Suitable ink jet printers include, for example, thermal printers, piezoelectric printers, continuous printers, valve printers and the like. Similarly, any suitable substrate can be employed including plain papers, bonded papers, coated papers, transparency materials, textile materials, plastics, polymeric films, inorganic substrates and the like.

Non-limiting illustrations of the present invention follow.

EXAMPLE 1

A modified carbon black having $C_6H_4SO_3^-Na^+$ surface groups was prepared by charging a continuous pin mixer with 100 parts per hour of a carbon black having a BET surface area of 200 $m^2/g$ (BET surface area determined according to ASTM D-4820) and DBPA of 122 mL/100 g (DBPA sturcture data detemined according to ASTM D-2414), 12.5 parts per hour of sulfanilic acid and 5.2 parts per hour of sodium nitrite as an aqueous solution. The resultant material was a mixture of an ionically charged modified carbon black and water containing 60% solids. The modified carbon black product was diluted with water and filtered before use.

Ink compositions were prepared by mixing a 20%, by weight, dispersion of the ionically charged modified carbon black having $C_6H_4SO_3^-$, $Na^+$ surface groups with varying concentrations of glycerol (available from Aldrich Chemical Co., Milwaukee, Wis.) and the remainder distilled water. The resultant inks contained 5%, by weight, of the ionically charged modified carbon black. Other relevant ink properties of the resulting inks are illustrated in Table I.

TABLE I

| Sample | % glycerol in ink | Viscosity* (cps) | Surface Tension† (dynes/cm) | pH |
|---|---|---|---|---|
| 1 | 0 | 1.7 | 74.5 | 7.8 |
| 2 | 10 | 2.0 | 74.0 | 7.1 |
| 3 | 20 | 2.4 | 74.0 | 7.0 |
| 4 | 30 | 3.2 | 73.0 | 7.0 |
| 5 | 40 | 4.2 | 72.0 | 7.2 |
| 6 | 50 | 6.2 | 72.0 | 7.1 |

*Viscosity was measured using a No. 1 and No. 2 shell cup from Norcross Corporation, Newton, Massachusetts
†Surface tension was measured using a CSC DU NOUY Tensiomenter, No. 70535 from CSC Scientific Co., Inc. Fairfax, Virginia using ASTM D-1331 and D-1590 procedures.

The ink compositions were placed in Hewlett Packard 51626A cartridges (which had been previously emptied and cleaned) and tested for latency using a Hewlett-Packard DeskJet® 540 ink jet printer. The cartridges were removed from the printer and placed uncapped in an upside down position for a time period of 24 hours, 72 hours and 128 hours. After each time period, the cartridges were placed back in the printer and test patterns were generated. Latency is a measure of the amount of time for which a flow of ink through a nozzle can be stopped and later re-started without clogging. In this example, the latency of the inks was measured as a function of: 1) the percentage of firing nozzles after printing one test pattern; and 2) the number of pages required to yield a 100% firing. After the initial test pattern, a printer nozzle check, as described in the manufacturer's literature, was printed to determine the percentage of firing nozzles. Five additional test patterns were then printed and the point at which all nozzles began to fire was recorded. Excellent latency values would be 100% of the nozzles firing immediately, i.e. recoverability=0 pages. Latency results of the ink compositions are illustrated in Table II.

TABLE II

| | 24 Hour Latency | | 72 Hour Latency | | 168 Hour Latency | |
|---|---|---|---|---|---|---|
| Sample | % firing nozzles | Recoverability** (pages) | % firing nozzles | Recoverability** (pages) | % firing nozzles | Recoverability** (pages) |
| 1 | 0 | None | | | no further testing | |
| 2 | 0 | None | | | no further testing | |
| 3 | 50 | None | | | no further testing | |
| 4 | 100 | 0 | 100 | 0 | 100 | 0 |
| 5 | 100 | 0 | 100 | 0 | 100 | 0 |
| 6 | 100 | 0 | 100 | 0 | 100 | 0 |

**Recoverability = pages required to yield 100% nozzle firing.
None = no recovery. i.e. the nozzle remained clogged after 6 pages were printed.
Partial Recovery = some clogged nozzles recovered, but not all.
0 pages-all nozzles fired immediately.

As shown in Table 11, the ink compositions of samples 3 through 6 containing greater than 20% humectant and, in particular, equal or greater than 30% humectant demonstrated enhanced latency. Samples 4 through 6 showed 100% nozzle firing on 0 pages.

EXAMPLE 2

Ink compositions were prepared by repeating the procedure of Example 1, except that varying concentrations of ethylene glycol (available from Aldrich Chemical Co., Milwaukee, Wis.). The result ant inks similarly contained 5%, by weight, of the modified carbon black. Other relevant ink properties of the resulting inks are illustrated in Table III.

TABLE III

| Sample | % ethylene glycol in ink | Viscosity (cps) | Surface Tension (dynes/cm) | pH |
|---|---|---|---|---|
| 1 | 0 | 1.7 | 74.5 | 7.8 |
| 2 | 10 | 2.2 | 72.0 | 7.3 |
| 3 | 20 | 2.5 | 68.0 | 7.3 |
| 4 | 30 | 2.9 | 64.5 | 7.2 |

The ink compositions were placed in Hewlett Packard 51626A cartridges and tested for latency utilizing the procedure described in Example 1. Latency results of the ink compositions are illustrated in Table IV.

TABLE IV

| | 24 Hour Latency | | 72 Hour Latency | | 168 Hour Latency | |
|---|---|---|---|---|---|---|
| Sample | % firing nozzles | Recoverability** (pages) | % firing nozzles | Recoverability** (pages) | % firing nozzles | Recoverability** (pages) |
| 1 | 0 | None | | | no further testing | |
| 1 | 0 | None | | | no further testing | |
| 2 | 0 | None | | | no further testing | |

TABLE IV-continued

|  | 24 Hour Latency | | 72 Hour Latency | | 168 Hour Latency | |
| --- | --- | --- | --- | --- | --- | --- |
| Sample | % firing nozzles | Recoverability** (pages) | % firing nozzles | Recoverability** (pages) | % firing nozzles | Recoverability** (pages) |
| 3 | 81 | 1.25 | 98 | 1.25 | 4 | None |
| 4 | 100 | 0 | 100 | 0 | 100 | 0 |

**Recoverability = pages required to yield 100% nozzle firing.
None = no recovery. i.e. the nozzle remained clogged after 6 pages were printed.
Partial Recovery = some clogged nozzles recovered, but not all.
0 pages-all nozzles fired immediately.

As illustrated in Table IV, the ink compositions of samples 3 and 4 containing equal or greater than 20% of ethylene glycol demonstrated an improvement in latency when compared to ink compositions containing less than 20% ethylene glycol or no humectant.

EXAMPLE 3

Ink compositions were prepared by repeating the procedure of Example 1, except that various humectants (available from Aldrich Chemical Co., Milwaukee, Wis.) in accordance with the present invention was substituted for the glycerol. The resultant inks similarly contained 5%, by weight, of the modified carbon black. Other relevant ink properties of the resulting inks are illustrated in Table V.

TABLE V

| Sample | % humectant | humectant | Viscosity (cps) | Surface Tension (dynes/cm) | pH |
| --- | --- | --- | --- | --- | --- |
| 1 | 0 | NA | 1.7 | 74.5 | 7.8 |
| 2 | 30 | 1,3 propanediol | 3.9 | 54.0 | 7.0 |
| 3 | 25 | 1,4 butanediol | 3.7 | 58.5 | 6.9 |
| 4 | 20 | 1,5 petanediol | 3.0 | 54.0 | 6.9 |
| 5 | 30 | 1,2,4 butanetriol | 3.6 | 67.0 | 6.0 |
| 6 | 30 | 1,1,1tris(hydroxymethyl) ethane | 4.1 | 65.0 | 7.5 |
| 7 | 20 | mesoerythritol | 2.4 | 75.5 | 7.2 |
| 8 | 30 | xylitol | 3.2 | 77.0 | 7.1 |

The concentration of the humectant in the ink compositions of Table V were chosen based on the compatibility with the pigment dispersion of the modified carbon black. Compatibility was determined by mixing the pigment dispersion in varying concentrations of humectant. The resulting dispersion was evaluated using a light microscope at 400× magnification and compared to a neat pigment dispersion (i.e. no humectant). The ink compositions of samples 2–8 in Table V all exhibited a high level of compatibility.

The ink compositions were placed in Hewlett Packard 51626A cartridges and tested for latency after a 72 hour period utilizing the procedure described in Example 1. Latency results of the ink compositions are illustrated in Table VI.

TABLE VI

| | 72 Hour Latency | |
| --- | --- | --- |
| Sample | % firing nozzles | Recoverability** (pages) |
| 1 | 0 | None |
| 2 | 100 | 0 |
| 3 | 100 | 0 |
| 4 | 100 | 0 |
| 5 | 100 | 0 |
| 6 | 98 | 5 |
| 7 | 31 | 5 |
| 8 | 98 | None |

**Recoverability = pages required to yield 100% nozzle firing.
None = no recovery. i.e. the nozzle remained clogged after 6 pages were printed.
Partial Recovery = some clogged nozzles recovered, but not all.
0 pages-all nozzles fired immediately.

All nozzles of the printhead containing the ink compositions of samples 2 through 5 all fired immediately and required zero (0) pages to recover. Although all the nozzles containing the ink composition of samples 6 and 7 did not fire immediately on page one, all nozzles recovered fully after five pages. Although one of the nozzles of the printhead did not recover after 6 pages, most of the nozzles containing the ink composition of sample 8 fired immediately. Table IV therefore illustrates that the ink compositions containing the varying humectants at concentrations equal or greater than 20% demonstrated an improvement in latency when compared to ink compositions lacking the humectant.

EXAMPLE 4

Ink compositions were prepared by repeating the procedure of Example 1, except that a mixture of ethylene glycol and glycerol (both available from Aldrich Chemical Co., Milwaukee, Wis.) was substituted for glycerol. The resultant inks similarly contained 5%, by weight, of the modified carbon black. Other relevant ink properties of the resulting inks are illustrated in Table VII.

TABLE VII

| Sample | % humectant | Viscosity (cps) | Surface Tension (dynes/cm) | pH |
| --- | --- | --- | --- | --- |
| 1 | 0 | 1.7 | 74.5 | 7.8 |
| 2 | 15% ethylene glycol & 15% glycerol mixture | 3.0 | 68.0 | 7.2 |

The ink compositions were placed in Hewlett Packard 51626A cartridges and tested for latency after a 72 hour period utilizing the procedure described in Example 1. Latency results of the ink compositions are illustrated in Table VIII.

TABLE VIII

| | 72 Hour Latency | |
| --- | --- | --- |
| Sample | % firing nozzles | Recoverability** (pages) |
| 1 | 0 | None |
| 2 | 100 | 0 |

**Recoverability = pages required to yield 100% nozzle firing.
None = no recovery. i.e. the nozzle remained clogged after 6 pages were printed.
Partial Recovery = some clogged nozzles recovered, but not all.
0 pages-all nozzles fired immediately.

As illustrated in Table VIII, the ink composition containing the ethylene glycol/glycerol mixture demonstrated an improvement in latency when compared to ink compositions lacking the humectant. As a result, it is expected that various mixtures of the humectant of the present invention would also be suitable as described herein.

EXAMPLE 5

Ink compositions were prepared by repeating the procedure of Example 1, except that varying levels of the modified carbon black was used with 30% glycerol (available from Aldrich Chemical Co., Milwaukee, Wis.). The relevant ink properties of the resulting inks are illustrated in Table IX.

TABLE IX

| Sample | % carbon black | Viscosity (cps) | Surface Tension (dynes/cm) | pH |
|---|---|---|---|---|
| 1 | 1 | 2.7 | 70.0 | 7.2 |
| 2 | 5 | 3.2 | 73.0 | 7.0 |
| 3 | 7 | 3.3 | 70.0 | 7.3 |
| 4 | 10 | 4.5 | 70.0 | 7.3 |

The ink compositions were placed in Hewlett Packard 51626A cartridges and tested for latency after a 72 hour period utilizing the procedure described in Example 1. Latency results of the ink compositions are illustrated in Table X.

TABLE X

| | 72 Hour Latency | |
|---|---|---|
| Sample | % firing nozzles | Recoverability** (pages) |
| 1 | 100 | 0 |
| 2 | 100 | 0 |
| 3 | 100 | 0 |
| 4 | 100 | 0 |

**Recoverability = pages required to yield 100% nozzle firing.
None = no recovery. i.e. the nozzle remained clogged after 6 pages were printed.
Partial Recovery = some clogged nozzles recovered, but not all.
0 pages-all nozzles fired immediately.

As illustrated in Table X, the ink composition of the present invention may be used with various levels of the ionically charged pigment while maintaining an improvement in latency.

EXAMPLE 6

Ink compositions were prepared by repeating the procedure of Example 1, except that various bases were also added to the compositions to adjust the pH of the ink compositions to approximately 8.5. The relevant ink properties of the resulting inks are illustrated in Table XI.

TABLE XI

| Sample | type of base | % glycerol | Viscosity (cps) | Surface Tension (dynes/cm) | pH |
|---|---|---|---|---|---|
| 1 | sodium hydroxide | 30 | 3.0 | 70.0 | 8.5 |
| 2 | ammonium hydroxide | 30 | 3.2 | 73.0 | 8.5 |
| 3 | triethylamine | 30 | 3.2 | 70.0 | 8.5 |
| 4 | dimethylethanolamine | 30 | 3.2 | 70.0 | 8.7 |

The ink compositions were placed in Hewlett Packard 51626A cartridges and tested for latency after a 72 hour period utilizing the procedure described in Example 1. Latency results of the ink compositions are illustrated in Table XII.

TABLE XII

| | 72 Hour Latency | |
|---|---|---|
| Sample | % firing nozzles | Recoverability** (pages) |
| 1 | 100 | 0 |
| 2 | 100 | 0 |
| 3 | 100 | 0 |
| 4 | 100 | 0 |

**Recoverability = pages required to yield 100% nozzle firing.
None = no recovery. i.e. the nozzle remained clogged after 6 pages were printed.
Partial Recovery = some clogged nozzles recovered, but not all.
0 pages-all nozzles fired immediately.

The ink composition of Table XII all exhibited improved latency in accordance with the present invention.

EXAMPLE 7

A modified carbon black having $C_6H_4NC_5H_5^+Cl^-$ surface groups was prepared by adding 8.31 g of silver nitrate to a solution of 11.2 g of N-(4-aminophenyl)pyridinium chloride in water. The mixture was stirred at 70° C.–80° C. for one hour and stored at room temperature overnight. The mixture was then heated at 70° C.–80° C. for an additional hour, cooled and filtered through a bed of diatomaceous earth. A portion of the resulting solution (53.5 g) was added to 10 g of a carbon black having a CTAB surface area of 108 m²/g (CTAB surface area determined according to ASTM D-3765) and DBPA of 116 mL/100 g (DBPA sturcture data detemined according to ASTM D-2414). Approximately 35 g of water and 0.7 g of concentrated HCl was added to the dispersion. The resulting dispersion was stirred at 90° C. for 2 hours and dried in an oven at 125° C. to form an ionically charged modified carbon black having $C_6H_4NC_5H_5^+Cl^-$ surface groups.

Ink compositions were prepared by mixing a 20%, by weight, dispersion of the ionically charged modified carbon black having $C_6H_4NC_5H_5^+Cl^-$ surface groups. with varying concentrations of glycerol (available from Aldrich Chemical Co., Milwaukee, Wis.) and the remainder distilled water. The resultant inks contained 5%, by weight, of the modified carbon black. Other relevant ink properties of the resulting inks are illustrated in Table XIII.

TABLE XIII

| Sample | % glycerol in ink | Viscosity (cps) | Surface Tension (dynes/cm) | pH |
|---|---|---|---|---|
| 1 | 10 | 2.1 | 74.0 | 3.0 |
| 2 | 20 | 2.6 | 74.0 | 3.0 |
| 3 | 30 | 3.2 | 73.0 | 2.9 |

The ink compositions were placed in Hewlett Packard 51626A cartridges and tested for latency utilizing the procedure described in Example 1. Latency results of the ink compositions are illustrated in Table XIV.

TABLE XIV

| Sample | 24 Hour Latency | | 72 Hour Latency | | 168 Hour Latency | |
|---|---|---|---|---|---|---|
| | % firing nozzles | Recoverability** (pages) | % firing nozzles | Recoverability** (pages) | % firing nozzles | Recoverability** (pages) |
| 1 | 50 | 1.25 | 88 | 1.5 | 71 | Partial Recovery |
| 2 | 100 | 0.5 | 94 | 1.25 | 19 | 4 |
| 3 | 94 | 1.25 | 56 | 2.0 | 4 | 3 |

\**Recoverability = pages required to yield 100% nozzle firing.
None = no recovery. i.e. the nozzle remained clogged after 6 pages were printed.
Partial Recovery = some clogged nozzles recovered, but not all.
0 pages-all nozzles fired immediately.

Table XIV illustrates that ink compositions containing equal or greater than 20% glycerol demonstrated an improvement in latency when compared to ink compositions containing a lesser amount of humectant. For example, after a 168 hour latency period, all nozzles of the printhead recovered after 4 pages.

EXAMPLE 8

Ink compositions were prepared by repeating the procedure of Example 7, except that varying concentrations of ethylene glycol (available from Aldrich Chemical Co., Milwaukee, Wis.) was used as the humectant. The resultant inks similarly contained 5%, by weight, of the modified carbon black. Other relevant ink properties of the resulting inks are illustrated in Table XV.

TABLE XV

| Sample | % ethylene glycol ink | Viscosity (cps) | Surface Tension (dynes/cm) | pH |
|---|---|---|---|---|
| 1 | 10 | 2.0 | 71.0 | 3.1 |
| 2 | 20 | 2.5 | 67.0 | 3.0 |
| 3 | 30 | 3.0 | 65.0 | 3.9 |

The ink compositions were placed in Hewlett Packard 51626A cartridges and tested for latency utilizing the procedure described in Example 1. Latency results of the ink compositions are illustrated in Table XVI.

TABLE XVI

| Sample | 24 Hour Latency | | 72 Hour Latency | | 168 Hour Latency | |
|---|---|---|---|---|---|---|
| | % firing nozzles | Recoverability** (pages) | % firing nozzles | Recoverability** (pages) | % firing nozzles | Recoverability** (pages) |
| 1 | 75 | Partial Recovery | 0 | None | Not further tested | |
| 2 | 90 | 2 | 92 | 3 | 0 | None |
| 3 | 80 | 3 | 60 | Partial Recovery | 12 | None |

\**Recoverability = pages required to yield 100% nozzle firing.
None = no recovery. i.e. the nozzle remained clogged after 6 pages were printed.
Partial Recovery = some clogged nozzles recovered, but not all.
0 pages-all nozzles fired immediately.

As illustrated in Table XIV, ink compositions containing equal or greater than 20% of ethylene glycol demonstrated an improvement in latency when compared to ink compositions containing less then 20%, especially after 74 hours. It is recognized that although the ethylene glycol does show improvement in latency, glycerol may be a preferred humectant, as shown in Example 7, with an ionically charged modified carbon black having $C_6H_4NC_5H_5^+Cl^-$ surface groups.

As described herein, the ink compositions of the present invention demonstrated characteristics which make them desirable for many printing systems, especially for ink jet ink systems. Particularly, the ink compositions have improved latency and are expected to exhibit, when formulated in actual ink systems, good physical properties such as, pH, viscosity, and surface tension. In addition, the ink compositions of the present invention are further expected to produce quality images having good waterfastness.

It is further understood that the present invention is not limited to the particular embodiments shown and described herein, but that various changes and modifications may be made without departing from the scope and spirit of the invention.

What is claimed is:

1. An ink composition, comprising a) a liquid vehicle, b) an anionically charged pigment or a cationically charged pigment, and c) a polyol humectant having at least two hydroxyl groups, wherein said humectant is present in an amount equal to or above 20% by weight of ink composition, an wherein said pigment has attached at least one organic group comprising at least one aromatic group or a $C_1$–$C_{12}$ alkyl group directly attached to said pigment, wherein a), b), and c) are different from each other.

2. The ink composition of claim 1, wherein said ink composition is an aqueous ink composition.

3. The ink composition of claim 1, wherein said charged pigment is selected from the group consisting of: black, blue, brown, cyan, green, violet, magenta, red, orange, yellow and mixtures thereof.

4. The ink composition of claim 1, wherein said organic group of said pigment is selected from the group consisting of: $C_6H_4N(CH_3)_3^+X^-$, $C_6H_4COCH_2N(CH_3)_3^+X^-$, and $C_6H_4(NC_5H_5)^+X^-$, wherein $X^-$ is a monovalent anion.

5. The ink composition of claim 1, wherein said charged pigment is present in an amount between about 1% and about 20%, by weight, of said ink composition.

6. The ink composition of claim 5, wherein said charged pigment is present in an amount between about 2% and about 10%, by weight, of said ink composition.

7. The ink composition of claim 1, wherein said humectant is present in an ranging between 20%, by weight, and 35% by weight, of said ink composition.

8. The ink composition of claim 1, wherein said glycol is a ethylene glycol, butylene glycol, propylene glycol, diethylene glycol, dipropylene glycol, pentamethylene glycol, polyethylene glycol, polypropylene glycol, trimethylene glycol and mixtures thereof.

9. The ink composition of claim 1, wherein said polyol is a butanetriol, trishydroxymethylethane, mesoerythritol, xylitol and mixtures thereof.

10. The ink composition of claim 1, wherein said composition further comprises a polymer selected from the group consisting of: polyvinyl alcohol, polyester, polyestermelamine, styrene-acrylic acid copolymers, styrene-maleic acid copolymers, styrene-maleic acid-alkyl acrylate copolymers, styrene-metacrylic acid copolymers, styrene-metacrylic acid-alkyl acrylate copolymers, styrene-maleic half ester copolymers, vinyl napthalene-acrylic acid copolymers, vinyl napthalene-maleic acid copolymers and salts and mixtures thereof.

11. The ink composition of claim 1, wherein said composition further comprises a polymer selected from the group consisting of: polyvinylimidazole, derivatives of polyvinylimidazole, copolymers of vinylimidazole, copolymers of vinylimidazole derivatives, polyvinylpyridine, derivatives of polyvinylpyridine, copolymers of vinylpyridine, copolymers of vinylpyridine derivatives, polyethyleneimine, derivatives of polyethyleneime, and mixtures thereof.

12. The ink composition of claim 1, wherein said charged pigment is a carbon black having $C_6H_4N(CH_3)_3{}^+Cl^-$ surface groups and said humectant is glycerol.

13. (Amended) The ink composition of claim 1, wherein said charged pigment is carbon black having $C_6H_4SO_3{}^-Na^+$ surface groups and said humectant is glycerol.

14. The ink composition of claim 1, wherein said charged pigment is a carbon black having $C_6H_4SO_3{}^-Na^+$ surface groups and said humectant is ethylene glycol.

15. The ink composition of claim 1, wherein said composition further comprises an additive selected from the group consisting of: binders, biocides, buffers, drying accelerators, humectants, penetrants, and surfactants.

16. The ink composition of claim 1, wherein said ink composition is an ink jet ink.

17. The ink composition of claim 1, wherein said charged pigment is an anionically charged pigment.

18. The ink composition of claim 1, wherein said charged pigment is a cationically charged pigment.

19. The ink composition of claim 1, wherein said organic group is $C_6H_4SO_3{}^-M^+$ or $C_6H_4CO_2{}^-M^+$, wherein $M^+$ is $Na^+$, $K^+$, or $Li^+$.

20. The ink composition of claim 1, wherein said pigment comprises at least one aromatic group directly attached to said pigment.

21. The ink composition of claim 1, wherein said humectant is a glycol or a glycerol.

* * * * *